June 18, 1968     T. F. GUNDLACH     3,388,871
CRUSHING ROLL AND SEGMENTS THEREFOR
Filed Jan. 28, 1966     2 Sheets-Sheet 1
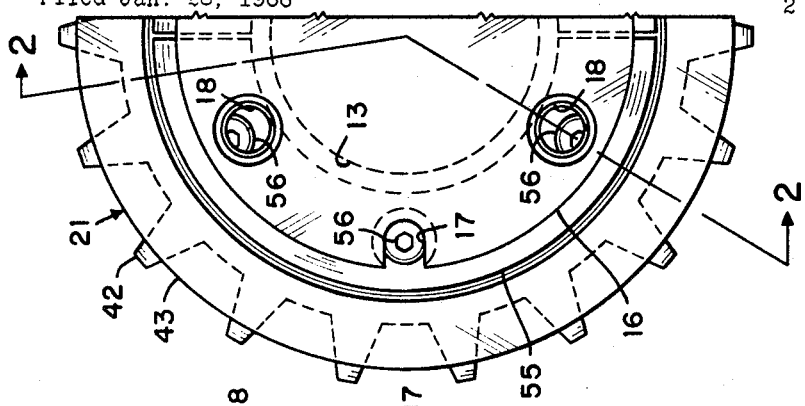
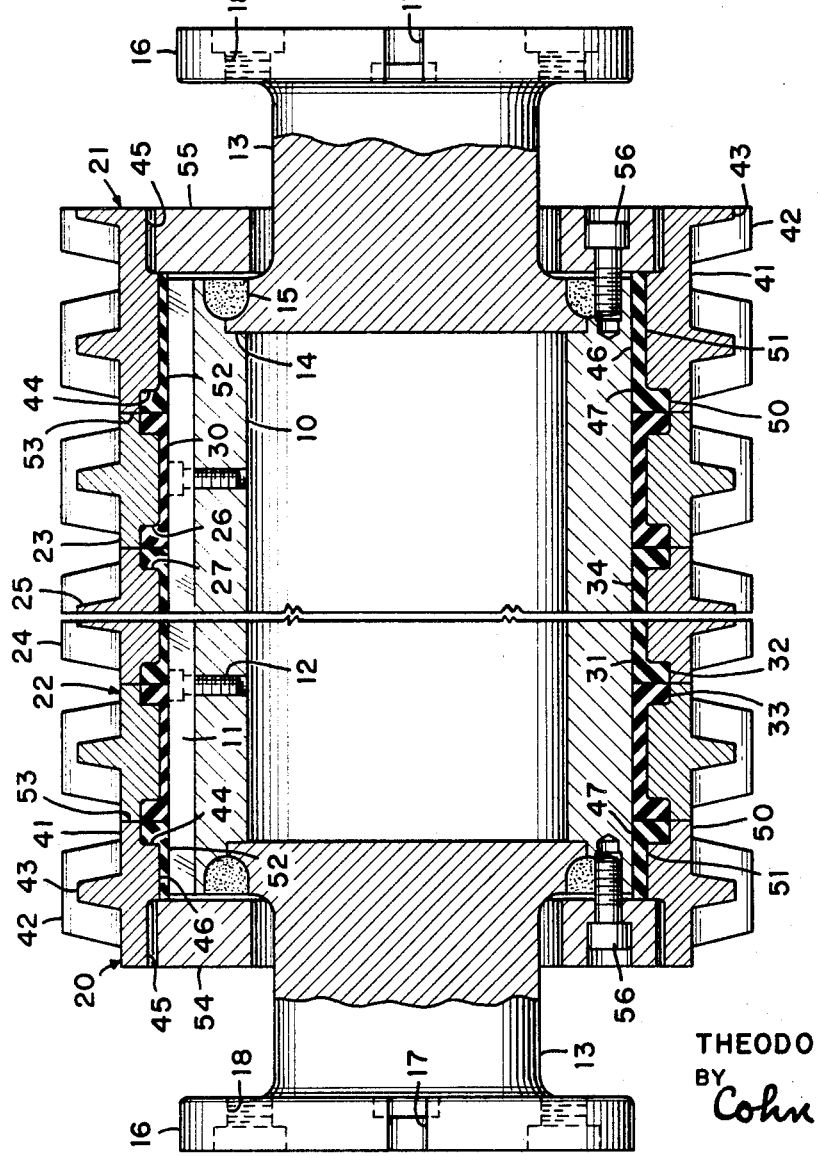
INVENTOR
THEODORE F. GUNDLACH
BY
*Cohn and Powell*
ATTORNEYS

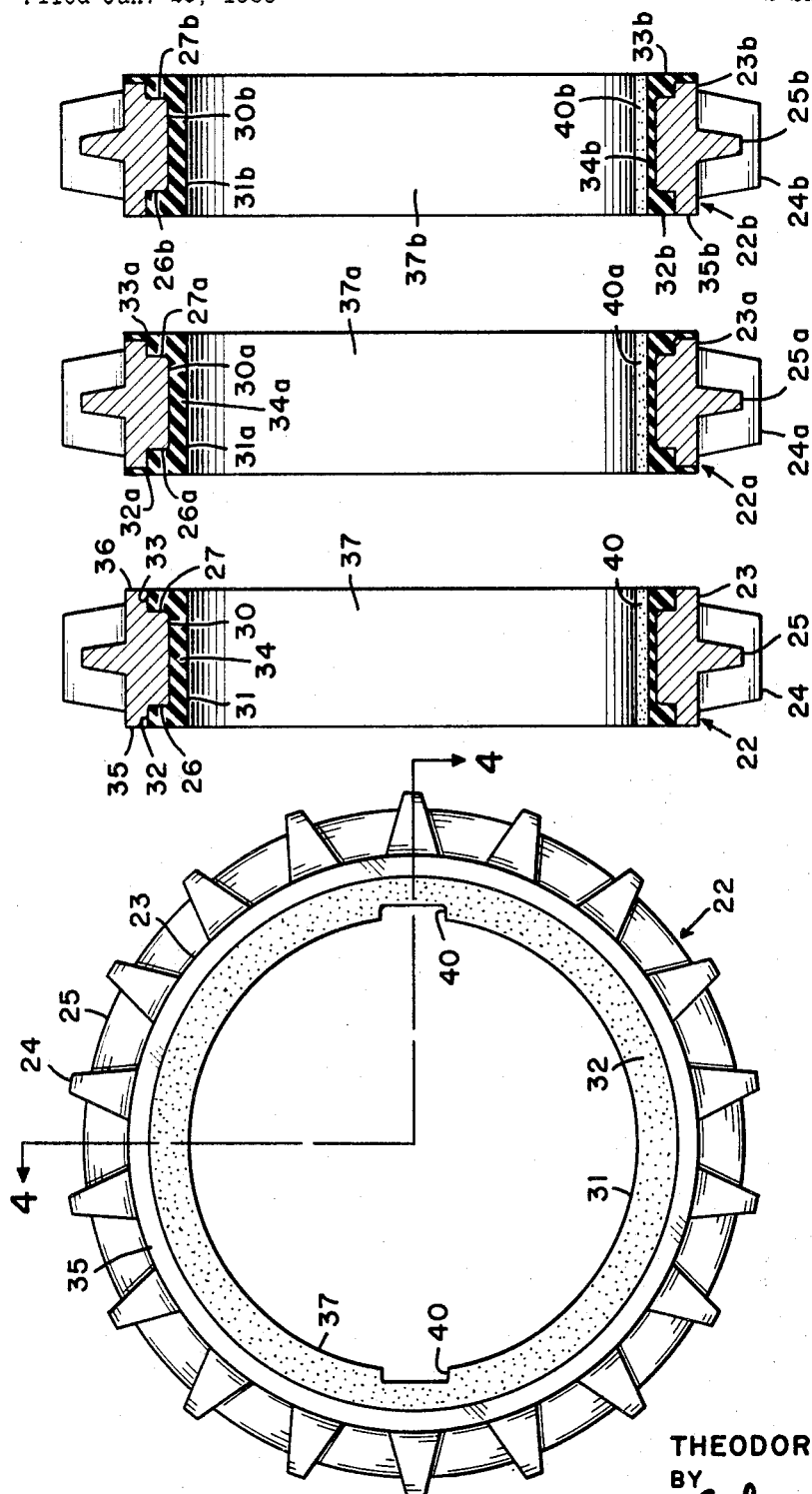

United States Patent Office 3,388,871
Patented June 18, 1968

3,388,871
CRUSHING ROLL AND SEGMENTS THEREFOR
Theodore F. Gundlach, Belleville, Ill., assignor to T. J. Gundlach Company, Belleville, Ill., a corporation of Illinois
Filed Jan. 28, 1966, Ser. No. 523,616
7 Claims. (Cl. 241—295)

ABSTRACT OF THE DISCLOSURE

The crushing roll assembly includes a plurality of annular segments mounted in clamped relation on a back-up roll. Each segment includes a toothed, metal ring having a resilient liner molded to its inner periphery. A keyed connection is provided between the back-up roll and each resilient liner. The segments include peripheral lateral recesses at opposite side margins. Each liner is substantially U-shaped, having side flanges which occupy the recesses, the flanges extending substantially flush with the sides of the ring. A shaft secured to each end of the back-up roll includes a proportioned coupling. Split rings cooperate with the back-up roll to hold the segments in position and ensure a continuous liner seal.

---

This invention relates generally to improvements in a crushing roll, and more particularly to an improved crushing roll construction and assembly and to improved segments utilized in such roll.

In the heretofore conventional crushing rolls constructed of metal segments retained on a metal back-up roll, both the back-up roll and segments required machining to provide a precise fit, the segments were subject to breakage because of the low ductility and hence had relative low resistance to shock forces between the metal connection of the back-up roll and segments, the back-up roll was subject to wear and corrosion as the result of moisture and grip seeping between the segments to the back-up roll, and both the back-up roll and segments were subject to corrosion as a result of the metal-to-metal contact therebetween.

It is a major objective of the present invention to provide a crushing roll assembly that avoids the above mentioned disadvantages by eliminating expensive machining operations which reduces the cost of manufacture, by providing resilient liners between the back-up roll and segments to absorb shock forces effectively and thereby minimize the possibility of segment breakage, by providing resilient liners between the segments to form seals that prevent moisture and grit from reaching the back-up roll and thereby eliminate certain types of wear, and by providing resilient liners between the segments and back-up roll and between axially adjacent segments which prevent corrosion that otherwise might exist because of metal-to-metal contact.

An important object is to provide as an article of manufacture, a segment for a crushing roll that includes a metal ring having teeth on its outer periphery, and includes a resilient liner molded to the inner periphery of the ring, the liner providing an aperture adapted to receive and engage a back-up roll.

Another important objective is achieved by constructing the resilient liner of the crushing roll segment with a transverse keyway adapted to receive a coacting key on the back-up roll. The resilient liner is utilized as a component part of the driving connection between the segment and back-up roll.

Yet another important objective is afforded by the structural arrangement and molded connection of the resilient liner to the segment, whereby the resilient liner provides at least a portion of the opposed side margins of the segment adapted to engage the side margins of axially adjacent segments. The resilient liners of axially adjacent segments engage to provide effective seals.

An important objective is attained by constructing the inner periphery of the segment ring with lateral peripheral recesses at the side margins, and with a peripheral hub intermediate such lateral recesses, and by constructing the resilient liner to overlie the hub and occupy the lateral recesses to provide at least a portion of each opposed side margin of the segment adapted to engage a side margin of each axially adjacent and cooperating segment.

In one modification, the resilient liner is of substantially U-shape in cross-section having side flanges interconnected by an intervening web, the web overlying the ring hub and the side flanges occupying the lateral recesses to provide a portion of each side margin. These side flanges are substantially flush with the sides of the ring so that the resilient side flange and the side of the ring of each side margin of the segment is adapted to engage coacting portions of a corresponding side margin of an axially adjacent segment.

In another modified construction, the side flanges of the substantially U-shaped resilient liner occupy the lateral recesses and overlie the sides of the ring to provide resilient, flat side margins for the segment adapted to engage coacting side margins of the axially adjacent and cooperating segments.

In another modified construction of a segment, one of the side flanges is substantially flush with one side of the ring to provide a substantially flat side margin of the segment, while the other side flange overlies the other side of the ring to provide a substantially flat, resilient side margin adapted to engage the former stated side margin of an axially adjacent and cooperating segment.

Another importnt objective is realized by the assembly of a crushing roll in which a plurality of segments are mounted on a metal back-up roll in axially adjacent side-by-side relation, in which each segment includes a metal ring having teeth on its outer periphery and a resilient liner molded to its inner periphery, the liner providing an aperture receiving the back-up roll, in which the molded resilient liner of each segment engages the back-up roll and engages the liner of each axially adjacent segment to provide a seal therebetween, and in which means is provided for holding the segments in assembly on the back-up roll.

Still another important objective is achieved by the provision of a keying connection between the back-up roll and the molded resilient liner of each segment which holds the segments in axial alignment and drivingly interconnects the segments and back-up roll for rotation as a unit.

An important objective is provided by the structural arrangement in which the holding means in the crushing roll assembly includes end plates secured to the back-up roll, the end plates engaging the endmost segments to clamp the segments therebetween and sealingly engaging the molded resilient liners of the endmost segments about the periphery of the back-up roll.

Another important objective is afforded in the crushing roll assembly which includes a pair of end segments with intevening segments therebetween, each intervening segment having the inner periphery of its metal ring provided with lateral peripheral recesses at opposite side margins, and having its molded resilient liner occupying the lateral recesses and providing at least a portion of the opposite side margins so as to engage sealingly the corresponding side margins of axially adjacent intervening segments, and each end segment having the inner periphery of its metal ring provided with a lateral peripheral recess at its inwardly-facing side margin, and having its molded resilient liner occupying the last said lateral recess and providing at least a portion of the inwardly-facing side margin so as to engage sealingly the side margin of the axially adjacent intervening segment.

A further important objective is attained by a crushing roll assembly in which the resilient liner of each intervening segment is of substantially U-shape in cross-section having side flanges interconnected by a web, the web overlying the hub and sealingly engaging the back-up roll, and the side flanges occupying the lateral recesses and extending substantially flush with the sides of the ring to provide a portion of the opposite side margins. The resilient side flange and the side of the ring of each side margin of each intervening segment engage coacting portions of the side margins of axially adjacent segments. In a modified construction of the crushing roll assembly, the side flanges of the resilient liner of each intervening segment occupies the lateral recesses and overlies the sides of the ring to provide resilient, flat side margins engaging coacting side margins of axially adjacent segments.

An important objective is realized in a crushing roll assembly in which a shaft is secured to each end of the back-up roll, and a coupling means is carried by at least one of these shafts, the coupling means being of a lesser peripheral dimension than the back-up roll and segment apertures to enable the segments to pass over the coupling means and on to the back-up roll, and to enable assembly of the segments from one end of the back-up roll. It is advantageous to have the outside peripheral dimension of each coupling plate, constituting the coupling means, less than the peripheral dimension of the back-up roll and the segment apertures, wehreby to enable the segments to pass over either coupling plate and on to the back-up roll and to enable assembly of the segments from either end of the back-up roll.

Another important object is to provide a crushing roll that is simple and durable in construction, economical to manufacture and assemble, highly efficient in operation, and which will provide all of the advantageous functional results mentioned previously, and to provide a segment construction, and several modifications thereof, which can be advantageously utilized in this crushing roll assembly.

The foregoing and numerous other objects and advantages of the invention will more clearly appear from the following detailed description of a preferred embodiment and several modifications thereof, particularly when considered in connection with the accompanying drawings, in which:

FIG. 1 is a fragmentary end elevational view of the crushing roll assembly;

FIG. 2 is a cross-sectional view of the crushing roll assembly as taken along line 2—2 of FIG. 1;

FIG. 3 is a side elevational view of a roll segment;

FIG. 4 is a cross-sectional view of the sgment as taken along line 4—4 of FIG. 3;

FIG. 5 is a cross-sectional view similar to FIG. 4, but illustrating a modified construction of the metal ring and molded rubber liner, and FIG. 6 is a cross-sectional view similar to FIG. 4, but illustrating another modified construction of the metal ring and molded rubber liner.

The present improvements are directed to crushing rolls especially adapted for use in coal crushers, although such rolls can be advantageously utilized in crushers of other types to crush and break a wide variety of materials.

Referring now by characters of reference to the drawings, and first to FIG. 1, it will be understood that the crushing roll assembly includes an elongate, tubular back-up roll 10. The back-up roll 10 is substantially cylindrical having a substantially circular periphery in cross-section. It will be further understood that the cross-section of the back-up roll 10 can take any desired and convenient form, such as a square or hexagon, and can be solid rather than tubular.

A pair of longitudinal keys 11 (one of which is shown in FIG. 2) are placed on the roll periphery in diametrically opposed relation, the keys 11 extending substantially parallel to the longitudinal axis of the back-up roll 10. A plurality of screws 12 extend through each key 11 and into the tubular body of back-up roll 10 to secure the key 11.

Located at each end of the back-up roll 10 is a shaft 13. The shafts 13 are axially aligned coincident with the rotative axis of the back-up roll 10. Each shaft 13 includes an inner flange 14 abutting the end of the tubular body of back-up roll 10, the shaft flange 14 being secured to the back-up roll 10 by a peripheral, circular weld 15.

The opposite end of each shaft 13 includes an integral and enlarged coupling plate 16, constituting a part of a coupling means, utilized to mount the shaft 13 for rotation. The coupling plate 16 is provided with a plurality of alternately placed side-opening recesses 17 and complete holes 18 about its periphery. The recesses 17 are adapted to receive bolts (not shown) which clamp the coupling plate 16 to a cooperating coupling plate (not shown). The holes 18 are threaded to receive screws threadedly interconnecting the coupling plate 16 with such cooperating coupling plate (not shown).

For reasons which will later appear, the peripheral dimension or the diameter of coupling plate 16 is less than the peripheral dimension or the diameter of the back-up roll 10.

Mounted on and carried by the back-up roll 10 are a pair of end segments generally indicated at 20 and 21 and a plurality of intervening segments referred to at 22.

The detailed construction of the intervening segments 22 is best shown in FIGS. 2–4. Each intervening segment 22 includes a metal ring 23 having a plurality of teeth 24 and 25 on its outer periphery. The inner periphery of metal ring 23 includes a pair of lateral, peripheral recesses 26 and 27 at the sides of the ring 23, and includes a peripheral hub 30 located between the lateral recesses 26 and 27.

Molded to the metal ring 23 is a resilient liner 31 made of rubber or a like material that can be molded to metal. The resilient liner 31 is of substantially U-shape having side, peripheral flanges 32 and 33 interconnected by an integral web 34. The web 34 overlies the ring hub 30, and the side flanges 32 and 33 occupy the lateral ring recesses 26 and 27 respectively.

In the embodiment of FIG. 4, the side flanges 32 and 33 are substantially flush with the sides of metal ring 23 to provide substantially flat, opposed side margins of the segment 22. Each side margin of the segment 22 consists of a side flange 32 or 33 of the resilient liner 31 and a side 35 or 36 respectively of the metal ring 23. It will be noted that the resilient liner 31 constitutes at least a portion of each side margin of segment 22.

The resilient liner 31 is provided with an aperture 37 conforming to the peripheral configuration of the tubular body forming the back-up roll 10. Thus, the resilient liner 31 sealingly engages the back-up roll 10.

Formed transversely in the inner periphery of resilient liner 31 are a pair of diametrically opposed keyways 40 receiving the coacting keys 11 secured to the outer periphery of back-up roll 10. The keys 11 and keyways 40 constitute a keying connection between the intervening segments 22 and the body of back-up roll 10.

The peripheral dimension or diameter of the liner aperture 37 is greater than the peripheral dimension or diameter of either coupling plate 16 so that the intervening segments 22 can be passed over either coupling plate 16 and on to the back-up roll 10, thereby enabling assembly of the segments from either end of the back-up roll 10.

When the intervening segments 22 are located in adjacent side-by-side relation on the back-up roll 10, as is best seen in FIG. 2, the resilient rubber liner 31 of each intervening segment 22 will sealingly engage the body of back-up roll 10 and will sealingly engage the resilient rubber liner of the next axially adjacent segment 22. More particularly, the side margins of each intervening segment 22 will be contiguous with a coacting side margin of the next axially adjacent segment 22. For example, the resilient side flange 32 and the ring side 35 constituting one side margin of one intervening segment 22 engage respectively the resilient side flange 33 and ring side 36 of the next axially adjacent intervening segment 22 located at one side, while the resilient side flange 33 and ring side 36 constituting the opposite side margin of this intervening segment 22 engage respectively the resilient side flange 32 and ring side 35 of the next axially adjacent intervening segment 22 located at the opposite side.

The detailed constructions of the end segments 20 and 21 are best shown in FIG. 2. While some dimensions of the end segments 20 and 21 differ slightly, the over-all construction is closely similar so that corresponding reference numbers will be utilized.

Each of the end segments 20 and 21 includes a metal ring 41 having a plurality of teeth 42 and 43 on its outer periphery. The inner periphery of metal ring 41 is provided with a lateral, peripheral recess 44 at its inwardly-facing side margin. The outwardly-facing side margin of metal ring 41 is undercut to provide a peripheral recess 45. An integral peripheral hub 46 is located between the inwardly-facing lateral recess 44 and the outwardly-facing recess 45.

Each of the end segments 20 and 21 includes a resilient liner 47 molded to the inner periphery of metal ring 41, the resilient liner 47 being formed of a rubber or like material. This resilient liner 47 consists of a side flange 50 occupying the inwardly-facing lateral recess 44, and a web 51 overlying the ring hub 46 and terminating at the outwardly-facing recess 45. For reasons which will later appear, the web 51 of the resilient liner 47 extends slightly beyond the body of back-up roll 10.

The resilient liner 47 of each end segment 20 and 21 is provided with an aperture similar to the aperture 37 of the intervening segments 22 and of the same peripheral dimension or diameter so as to pass over either coupling plate 16 and on to the back-up roll 10.

Similar to the intervening segments 22, the resilient liner 47 of each end segment 20 and 21 is provided with a pair of diametrically opposed and transverse keyways 52 receiving the longitudinally disposed keys 11 when the end segment is mounted on the back-up roll.

The resilient side flange 50 of the resilient liner 47 is substantially flush with the side 53 of ring 41 to provide a substantially flat, inwardly-facing side margin engaging the side margin of the adjacent intervening segment 22. It will be understood that in each end segment 20 and 21, the side flange 50 of the resilient liner 47 constitutes at least a portion of the inwardly-facing side margin.

Specifically, when each end segment 20 and 21 is mounted on the back-up roll 10, the web 51 of the resilient liner 47 sealingly and frictionally engages the body of the back-up roll 10, and the resilient side flange 50 sealingly and frictionally engages the corresponding resilient side flange 32 or 33 of the next axially adjacent intervening segment 22, while the ring side 53 abuts the ring side 35 or 36 of the next adjacent segment 22.

When the segments 20, 21 and 22 are mounted on the back-up roll 10, the teeth 24, 25, 42 and 43 form a predetermined pattern for the crushing roll. This tooth pattern is maintained by the keying connection between the segments 20, 21 and 22 and the body of the back-up roll 10.

A pair of clamping rings 54 and 55 are secured to the opposite ends of the back-up roll 10 by a plurality of screws 56. Each of the clamping rings 54 and 55 is of a split ring construction so as to fit about the associated shaft 13. The clamping rings 54 and 55 seat in the outwardly-facing recesses 45 of the associated end segments 20 and 21 respectively, the clamping rings 54 and 55 engaging the metal rings 41 to clamp the intervening segments 22 therebetween, and engaging the webs 51 of the resilient liners 47 to provide an effective seal about the periphery of the back-up roll 10.

It is thought that the assembly and functional advantages of the crushing-roll have become fully apparent from the foregoing detailed description of parts, but for completeness of disclosure such assembly will be briefly described. It will be assumed that the shafts 13 are welded to the body of back-up roll 10 and that the keys 11 are secured in diametrically opposed relation to the back-up roll 10. Further, it will be assumed that the end segments 20 and 21 and the intervening segments 22 have been preassembled and manufactured in accordance with the previous description of parts. As mentioned previously, the segments 20, 21 and 22 can be assembled from either end of the back-up roll 10. For the purpose of this explanation, it will be assumed that the segments are assembled from the right end of the crushing roll as viewed in FIG. 2.

The retaining ring 54 is secured to the left end of the back-up roll 10 by screws 56. Then, the end segment 20 is passed over the right coupling 16 and over the right end of back-up roll 10 with its keyways 52 aligned with and receiving the keys 11. This end segment 20 is moved axially along the back-up roll 10 into engagement with the retaining ring 54, the retaining ring 54 being located within the outwardly-facing recess 45 and engaging both the metal ring 41 and the resilient liner 47. Then, a plurality of intervening segments 22 are passed over the same coupling plate 16 and over the right end of back-up roll 10, the keyways 40 being aligned with and receiving the keys 11. The intervening segments 22 are moved axially along the back-up roll 10 into lateral abutment. When a suitable number of intervening segments 22 have been placed, the end segment 21 is passed over the coupling plate 16 and on to the right end of back-up roll 10 and moved axially into engagement with the next adjacent intervening segment 22. The retaining ring 55 is then secured to the right end of back-up roll 10 by screws 56, the retaining ring 55 being located within the outwardly-facing recess 45 of end segment 21 and engaging both the metal ring 41 and resilient liner 47 of such end segment 21. The retaining rings 54 and 55 cooperate to clamp the segments 20–22 therebetween and to clamp the laterally adjacent segments tightly into sealing relationship with each other.

The resilient liners 31 of the intervening segments 22 and the resilient liners 47 of the end segments 20–21 sealingly and frictionally interengage with the cooperating liners of axially adjacent segments to provide a seal therebetween and to provide an optimum driving connection therebetween. These seals between segments prevent moisture, grit and other material from passing between the segments to the back-up roll 10. Moreover, the resilient liners 31 and 47 of the segments 22 and 20–21 respectively, sealingly and frictionally engage the body of back-up roll 10 to prevent moisture and other foreign material from reaching the back-up roll 10 and to provide an optimum driving connection therebetween. The retaining rings 54 and 55 sealingly engage the resilient liners 47 of the end segments 20 and 21 about the periphery of the back-up roll to further protect the back-up roll from moisture and other foreign material.

The keying connection provided by the interengagement of keys 11 with the resilient liners 31 and 47 of the segments 22 and 20–21 respectively provides a positive drive between the segments and the back-up roll 10 so that the segments and back-up roll 10 turn as a unit. However, it will be importantly noted that the resiliency of the liners 31 and 47 enables a small degree of give between the individual segments 20–22 and back-up roll 10 whereby to absorb shock forces therebetween and minimize breakage of the segments. Moreover, it will be importantly noted that the face-to-face engagement of the resilient liners between laterally adjacent segments provides for an increased frictional drive between such cooperating laterally adjacent segments.

A modified construction of the intervening segment 22 is illustrated in FIG. 5. Because of the close similarity of parts, identical reference numbers will be utilized wherever possible to identify corresponding parts and structure. However, the letter a will be used as a suffix for the sake of clarity.

The intervening segment 22a of FIG. 5 includes a metal ring 23a. The outer periphery of metal ring 23a is provided with a plurality of teeth 24a and 25a. The inner periphery of metal ring 23a is provided with peripheral lateral recesses 26a and 27a interconnected by an intervening peripheral hub 30a. Molded to the metal ring 23a is a resilient liner 31a made of rubber or like material. The resilient liner 31a has a pair of peripheral side flanges 32a and 33a interconnected by an integral intervening web 34a. The web 34a overlies the ring hub 30a, while the side flanges 32a and 33a occupy the lateral recesses 26a and 27a respectively. In this embodiment, the side flanges 32a and 33a overlap the sides of the metal ring 23a to provide substantially flat, resilient side margins for the segment 22a adapted to engage coacting side margins of axially adjacent intervening segments 22a.

This construction of the resilient liner 31a provides for a greater sealing and friction area between contiguous and engaging resilient side flanges 32a and 33a with corresponding resilient side flanges 33a and 32a respectievly of axially adjacent segments 22a to provide a more effective seal between such axially adjacent segments 22a and to provide a more effective frictional contact therebetween tending to maintain the relative angular positions.

It will be understood that the resilient liner 31a of this modified intervening segment 22a is provided with an aperture 37a adapted to receive the back-up roll 10, and is provided with diametrically opposite keyways 40a adapted to receive the cooperating keys 11 on the back-up roll 10, all in the manner previously described with the assembly and operation of the segments 22.

Another modified construction of the intervening segment is illustrated in FIG. 6. Again, this modified segment is similar to those segments 22 and 22a previously described, and in fact constitutes a combination thereof. Because of the similarity, identical reference numbers will be utilized but the suffix b will be used for the sake of clarity.

The intervening segment 22b (FIG. 6) includes a metal ring 23b. The outer periphery of the metal ring 23b is provided with a plurality of teeth 24b and 25b. The inner periphery of metal ring 23b is provided with peripheral lateral recesses 26b and 27b interconnected by a peripheral hub 30b.

The segment 22b includes a resilient liner 31b having peripheral side flanges 32b and 33b interconnected by an integral web 34b. The web 34b overlies the ring hub 30b. The side flange 32b occupies the lateral recess 26b and constitutes a portion of the side margin of the segment 22b, similar to the construction of the embodiment of FIG. 4. For example, the side flange 32b is substantially flush with the ring side 35b to provide a substantially flat, peripheral side margin. The other side flange 33b occupies the lateral recess 27b and overlies the side of the ring to provide a resilient, flat side margin for the segment 22b similar to the construction illustrated in the embodiment of FIG. 5.

When assembled, the substantially flat, resilient side margin of segment 22b constituted by the side flange 33b engages frictionally and sealingly the side margin of the axially adjacent segment which is composed of the resilient side flange 32b and the metal ring side 35b.

Again, it will be understood that the resilient liner 31b is provided with an aperture 37b adapted to pass over either coupling plate 16 and the body of back-up roll 10. The inner periphery of the resilient liner 31b defining the aperture 37b is providde with a pair of transverse keyways 40b that receive the diametrically opposed keys 11 on the back-up roll 10. The assembly and operation of the intervening segments 22b are other wise the same as that previously described with the embodiment of intervening segment 22.

The resilient liners of the segments are disposed between the metal rings of such segments and the back-up roll, and consequently act as insulators that prevent or minimize the transfer of heat or cold between the metal rings and back-up roll. Moreover, these resilient liners act as insulators that prevent or minimize the conductance of electrical current between the metal rings and back-up roll that might otherwise be caused by static electricity or by voltage created by the contact of dissimilar metals of rings and back-up roll.

In addition, the use of resilient liners as component parts of the segments enables hard iron or steel, such as ni-hard iron or tungsten carbide, to be utilized for the rings. Because the quantity of metal required in the segments is reduced considerably by the use of the resilient liners, these relatively expensive hard metals can be used economically.

Although the invention has been described by making detailed reference to a preferred embodiment and several modifications thereof, such detail is to be understood in an instructive, rather than in any restrictive sense, many variants being possible within the scope of the claims hereunto appended.

I claim as my invention:

1. A segment for a crushing roll, comprising:
   (a) a metal ring including teeth on its outer periphery,
   (b) a resilient liner molded to the inner periphery of the ring, the liner providing an aperture adapted to receive and engage a back-up roll, and
   (c) the resilient liner being provided with a transverse keyway adapted to receive a coacting key on the back-up roll.

2. A segment for a crushing roll as defined in claim 1, in which:
   (d) the segment has opposed side margins,
   (e) the inner periphery of the ring includes lateral peripheral recesses at the side margins, and includes a peripheral hub intermediate the lateral recesses,
   (f) the resilient molded liner is of substantially U-shape in cross section having side flanges interconnected by an intervening web, the web overlying the ring hub and the side flanges occupying the lateral recesses to provide at least a portion of each side margin, and
   (g) the side flanges are substantially flush with the sides of the ring so that a cooperating resilient side flange and side of the ring constituting each side margin are adapted to engage coacting portions of a side margin of each axially adjacent segment to provide a continuous seal.

3. In a crushing roll:
   (a) a metal back-up roll,
   (b) a plurality of segments mounted on the back-up roll in adjacent side-by-side relation,
   (c) each segment including a metal ring having teeth on its outer periphery, and a resilient liner molded to its inner periphery, the liner being provided with an aperture receiving the back-up roll,
   (d) the molded resilient liner of each segment engaging the back-up roll and engaging the liner of each axially adjacent segment to provide a seal therebetween,
   (e) means holding the segments in assembly on the back-up roll, and
   (f) a keying connection provided between the back-up roll and the molded resilient liner of each segment, the keying connection holding the segments in axial alignment and drivingly rotating the segments and back-up roll as a unit.

4. A crushing roll as defined in claim 3, in which:
(g) the holding means includes end plates secured to the back-up roll and engaging the endmost segments on the back-up roll to clamp the segments therebetween, and
(h) the end plates sealingly engage the molded resilient liners of the endmost segments about the periphery of the back-up roll.

5. A crushing roll as defined in claim 3, in which:
(g) the segments include a pair of end segments with intervening segments therebetween,
(h) each intervening segment has the inner periphery of its metal ring provided with lateral peripheral recesses at opposite side margins, and has its molded resilient liner occupying the lateral recesses and providing at least a portion of the opposite side margins so as to engage sealingly the resilient liners of axially adjacent intervening segments,
(i) each end segment has the inner periphery of its metal ring provided with a lateral recess at its inwardly-facing side margin, and has its molded resilient liner occupying the last said lateral recess and providing at least a portion of the inwardly-facing side margin so as to engage sealingly the resilient liner of the axially adjacent intervening segment,
(j) the holding means include end plates secured to the ends of the back-up roll and engaging the outwardly-facing side margins of the end segments to clamp the segments therebetween, and
(k) the end plates engage sealingly the molded resilient liners of the end segments about the periphery of the back-up roll.

6. A crushing roll as defined in claim 3, in which:
(g) the segments include a pair of end segments with intervening segments therebetween,
(h) each intervening segment has the inner periphery of its metal ring provided with lateral peripheral recesses at opposite side margins, and has its molded resilient liner occupying the lateral recesses and providing at least a portion of the opposite side margins so as to engage sealingly the resilient liners of axially adjacent intervening segments,
(i) each end segment has the inner periphery of its metal ring provided with a lateral recess at its inwardly-facing side margin, and has its molded resilient liner occupying the last said lateral recess and providing at least a portion of the inwardly-facing side margin so as to engage sealingly the resilient liner of the axially adjacent intervening segment,
(j) the inner periphery of the metal ring of each intervening segment includes a peripheral hub intermediate the lateral recesses,
(k) the liner of each intervening segment is of substantially U-shape in cross section having side flanges interconnected by a web, the web overlying the hub and sealingly engaging the back-up roll, and the side flanges occupying the lateral recesses and extending substantially flush with the sides of the ring to provide a portion of the opposite side margins, and
(l) the resilient side flange and the substantially flush side of the metal ring of each side margin of each intervening segment engage coacting portions of the side margins of each axially adjacent intervening segment.

7. A crushing roll as defined in claim 3, in which:
(g) a shaft is secured to each end of the back-up roll,
(h) a coupling means is carried by at least one shaft, the coupling means being of a lesser peripheral dimension than the back-up roll and the segment apertures thereby enabling the segments to pass over the coupling means and on to the back-up roll, and enabling assembly of the segments from one end of th back-up roll, and
(i) the holding means includes split end rings secured to the back-up roll and engaging the endmost segments on the back-up roll to clamp the segments therebetween, the split end rings providing end plates having an aperture of a lesser periphery dimension than the coupling means and an external peripheral dimension greater than that of the back-up roll.

References Cited
UNITED STATES PATENTS

| | | | |
|---|---|---|---|
| 571,264 | 11/1896 | Culver | 241—295 X |
| 673,768 | 5/1901 | Fleming | 241—295 X |
| 2,589,603 | 3/1952 | Cohen | 241—294 X |
| 2,594,080 | 4/1952 | Shafter | 241—300 X |
| 2,970,775 | 2/1961 | Chapman | 241—300 X |
| 2,970,783 | 2/1961 | Cheyette | 241—300 |
| 3,089,409 | 5/1963 | Tretheway | 241—295 X |
| 3,138,338 | 6/1964 | McKenna | 241—294 |
| 3,194,506 | 7/1965 | Bourne | 241—300 |

HARRISON L. HINSON, *Primary Examiner.*